(12) United States Patent　(10) Patent No.: US 6,353,577 B1
Orban et al.　(45) Date of Patent: Mar. 5, 2002

(54) SEISMIC SENSOR UNITS

(76) Inventors: Jacques Joseph Henri Orban, Trudvangveien 17A, N-1342 Jar (NO); Didier Largeau, 12 impasse du moulin de Jubiciaux, 9190 Guf sur Yvette (FR); Andreas Wolfgang Laake, 37 Tudor Drive, Kingston upon Thames, Surrey KT2 5BW (GB); Hans Paulson, Maarstien 4, N-3188 Horten; Abdullah Akkoca, Nyvein 7, N-3080 Holmestrand, both of (NO)

( * ) Notice: Subject to any disclaimer, the term of this patent is extended or adjusted under 35 U.S.C. 154(b) by 0 days.

(21) Appl. No.: 09/269,016

(22) PCT Filed: Sep. 19, 1997

(86) PCT No.: PCT/GB97/02536

§ 371 Date: Mar. 17, 1999

§ 102(e) Date: Mar. 17, 1999

(87) PCT Pub. No.: WO98/12577

PCT Pub. Date: Mar. 26, 1998

(30) Foreign Application Priority Data

Sep. 20, 1996　(GB) ............................................. 9619699

(51) Int. Cl.$^7$ .................................................. G01V 1/18
(52) U.S. Cl. ........................................ 367/43; 367/178
(58) Field of Search ........................ 367/43, 606, 182, 367/178, 15, 188; 703/3; 702/6; 181/112; 174/113 R

(56) References Cited

U.S. PATENT DOCUMENTS

| | | | | |
|---|---|---|---|---|
| 4,078,223 A | * | 3/1978 | Strange | 340/7 R |
| 4,091,356 A | * | 5/1978 | Hutchins | 340/3 T |
| 4,458,341 A | * | 7/1984 | Goebel | 367/43 |
| 4,764,908 A | * | 8/1988 | Greer, Jr. | 367/178 |
| 5,189,642 A | * | 2/1993 | Donoho et al. | 367/15 |
| 5,379,025 A | * | 1/1995 | Tatom et al. | 340/601 |
| 5,469,403 A | * | 11/1995 | Young et al. | 367/6 |
| 6,075,754 A | * | 6/2000 | VanZandt et al. | 367/182 |

* cited by examiner

*Primary Examiner*—Hezron Williams
*Assistant Examiner*—Victor J. Taylor

(57) ABSTRACT

A seismic sensor unit (10) comprises a case (12) containing electronic circuits (18, 20) that serve to digitise and digitally process the output signals of a seismic sensor element (16) inside the case (12). A first digital filtering of acquired signals can be provided at sensor unit level before the data are further fed into a seismic network and further processed.

14 Claims, 5 Drawing Sheets

SEISMIC SENSOR UNITS

BACKGROUND OF THE INVENTION

1. Field of Invention

The present invention relates to seismic sensor units, and is more particularly but not exclusively concerned with seismic sensor units for land applications. Such sensor units, also called geophones, are used for detecting seismic signals that propagate through the ground. The output signals of numerous such geophones are fed into a seismic survey telemetry system and transmitted to recording and data processing units. Processed seismic data are then presented in form of seismic traces in a seismogram that is useful as information about subsurface stratigraphy.

2. Description of Prior Art

Most conventional geophones consist of a case that houses and secures at least one internal electric seismic sensor element that senses seismic signals in the ground. Thus, in order to provide a sufficient acoustic and mechanically stable contact with the ground most geophones are equipped with a spike or the like that is attached to the geophone case and planted into the ground. Electric cable is fixed to the case as well, to allow each geophone to be connected to other geophones and to transmit output signals to data acquisition units. The most commonly used seismic sensor elements in conventional geophones are moving coil sensor elements with a large dynamic range and good resolution. But the frequency bandwidth of moving coil geophones is limited due to relatively low frequency resonance, ie in the region of 10 to 30 Hz, and on the high side due to spurious frequency noise. And the performance of such moving coil geophones strongly depends on the verticality of the planted geophone.

During seismic data acquisition, a group of several conventional geophones is typically deployed over a certain area and interconnected to each other via cable. Usually the desired seismic signals are contaminated by unwanted noise signals, such as horizontally travelling waves, so-called ground-roll, and random (incoherent) noise such as wind noise, rain noise, scratching of the geophone case by vegetation, geophone cable oscillation, etc. In order to attenuate such noise, the analog output signals of a group of closely spaced geophones are grouped together by adding them into a single analog seismic group signal before being further processed. In total, a very large number of conventional geophones is needed in a seismic survey to realise such an analog method of improving the signal-to-noise ratio of the desired signals. Today, typically 24 geophones are needed per seismic trace.

SUMMARY OF THE INVENTION

It is therefore an object of the present invention to overcome the above described drawbacks of conventional geophones and, in a preferred implementation of the invention, to provide a seismic sensor unit that allows the signal-to-noise ratio of the output signals of the seismic sensor units to be improved with, and despite of, a significantly reduced number seismic sensor units per seismic trace.

According to the present invention, there is provided a seismic sensor unit comprising: a case that houses at least one electric seismic sensor element and allows said sensor unit to be placed on and acoustically coupled to the ground; a cable, fixed to the case, to allow the supply of power to the sensor unit and to transmit the sensor unit output signal to other seismic sensor units and/or to a signal processing unit; wherein the case also houses a first electronic circuit in which the output signal of the sensor element is digitised, and a second electronic circuit which comprises a telemetry interface module that serves to exchange signals and data with a seismic data acquisition network, said second electronic circuit including a signal filter module and a logic and signal conditioning module which applies calibration coefficients to the sensor unit output signal.

The major advantage of a seismic sensor unit according to the invention is that it allows digitised seismic data to be obtained from each individual sensor unit, which data can be digitally filtered in an adaptive manner, so that less sensor units are required per seismic trace. Such processing can be performed remotely, either in electronic boxes along the seismic line, in a central system computer or in a data processing centre. Because of the digital output signals from the seismic sensor units, long analog signal cables, which in conventional seismic systems cause signal disturbances due to loss and noise picked up along the cable, are no longer needed. All this reduces the cost of seismic data acquisition, inter alia by improving acquisition logistics, and improves seismic data quality.

Further embodiments of the seismic sensor unit according to the invention make use of feed-back controlled accelerometers as seismic sensor elements. In particular, the use of digital accelerometers that are capable of measuring DC signals allows the determination of the gravity component parallel to the sensor axis. This gravity measurement can be performed during a test period either before or after the seismic data acquisition. Quality control of acquired seismic data can be provided even during the measurement phase in the field.

Another embodiment of the seismic sensor unit according to the invention applies recently developed manufacturing technology of electronic components and sensor elements. The major advantage that can be thereby achieved is that the seismic sensor unit will be of a smaller size than geophones available today, and of less weight. Even in view of geophysical aspects, such smaller size of the seismic sensor element is advantageous, because it renders the seismic sensor less sensitive to non-linear noise.

BRIEF DESCRIPTION OF THE DRAWINGS

The present invention will be better understood from the following detailed description when taken into conjunction with the attached drawings, of which.

DETAILED DESCRIPTION OF THE PREFERRED EMBODIMENT

The seismic sensor unit according to this invention will be described with reference to the drawings of FIG. 1 through FIG. 7. For simplicity reasons, not all of the wiring inside the seismic sensor unit that interconnects electronic circuits and sensors is shown, since a person skilled in the art will easily understand from the following explanations how to provide such wiring.

Figure 1:
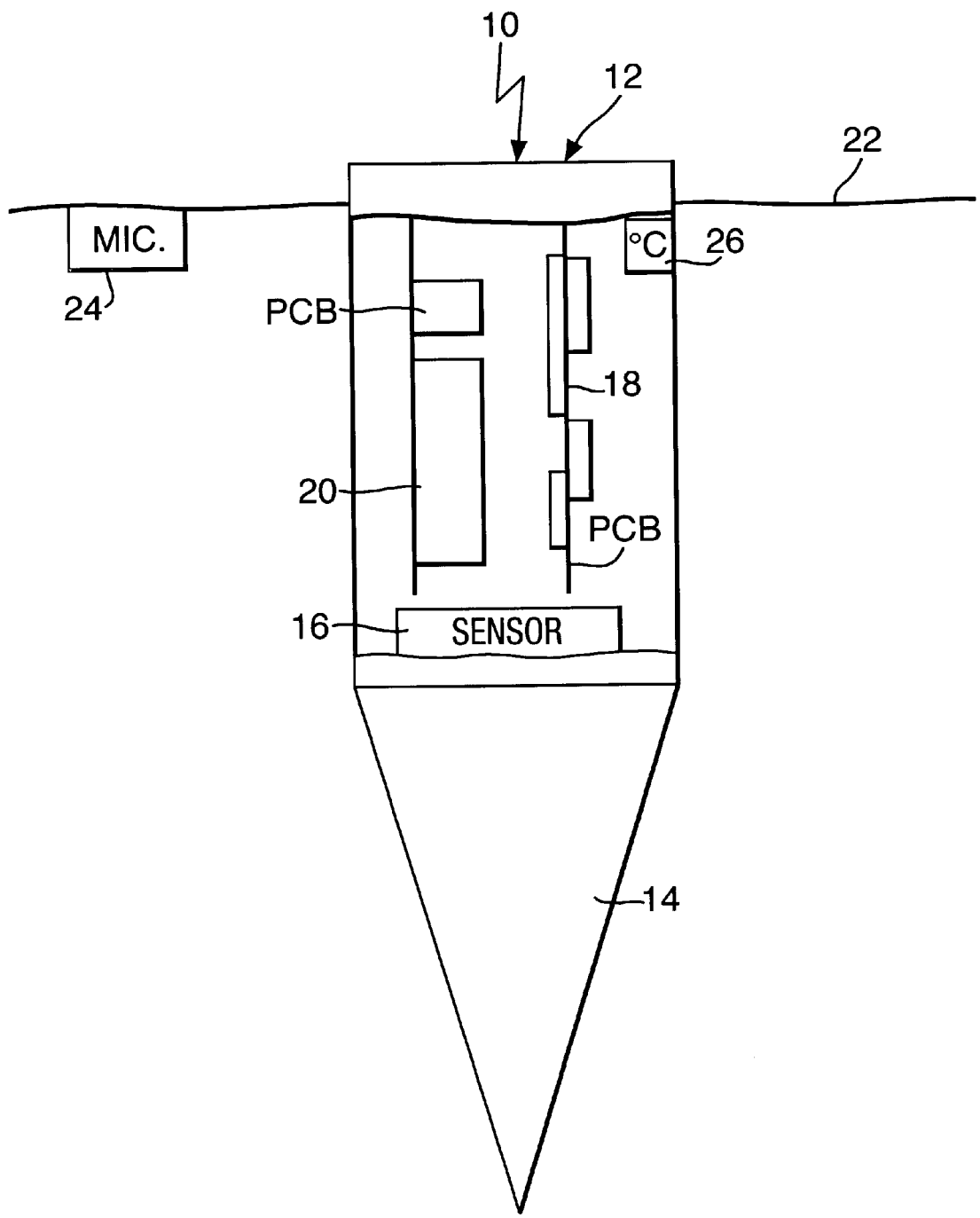
FIG. 1 is a schematic side view of a first embodiment of a seismic sensor unit according to the invention.

FIG. 1 shows schematically a preferred embodiment of a seismic sensor unit 10 according to the invention. A case 12 of the sensor unit 10 is shown partially broken-away in order more easily to explain its interior. A spike 14, well known from conventional geophones, is fixed to the case 12 and serves to plant the sensor unit 10 properly into the ground.

Inside the case 12, a seismic sensor element is shown at 16. The sensor element 16 illustrated in FIG. 1 as an example is a 1-component seismic sensor element. Although the seismic sensor unit 10 according to the invention is capable of operating with different types of seismic sensor elements, ie conventional moving coil sensor elements, the preferred seismic sensor element is a feed-back controlled accelerometer. The feed-back controlled accelerometer is preferably a silicon micro-machined sensor that allows the measurement of seismic signals down to very low frequencies, ie 3 Hz or lower, which, as explained later, are useful for verifying the verticality of the planted seismic sensor unit 10.

FIG. 1 also illustrates electronic circuits which are mounted on two printed circuit boards 18, 20. The electronic circuits will be described later in detail, together with their functions. A seismic cable 22 is fixed to the case 12 and connects the seismic sensor unit 10 to other seismic sensor unit and/or to a seismic system network which, for simplicity reasons, is not illustrated in FIG. 1. Attached to the cable 22 is a microphone 24 which is useful for determining acoustic noise that may affect the seismic signals. In order to allow compensation for temperature changes that may cause drift in the electronics, a temperature sensor 26 is used to determine the temperature inside the case 12.

Figure 2:
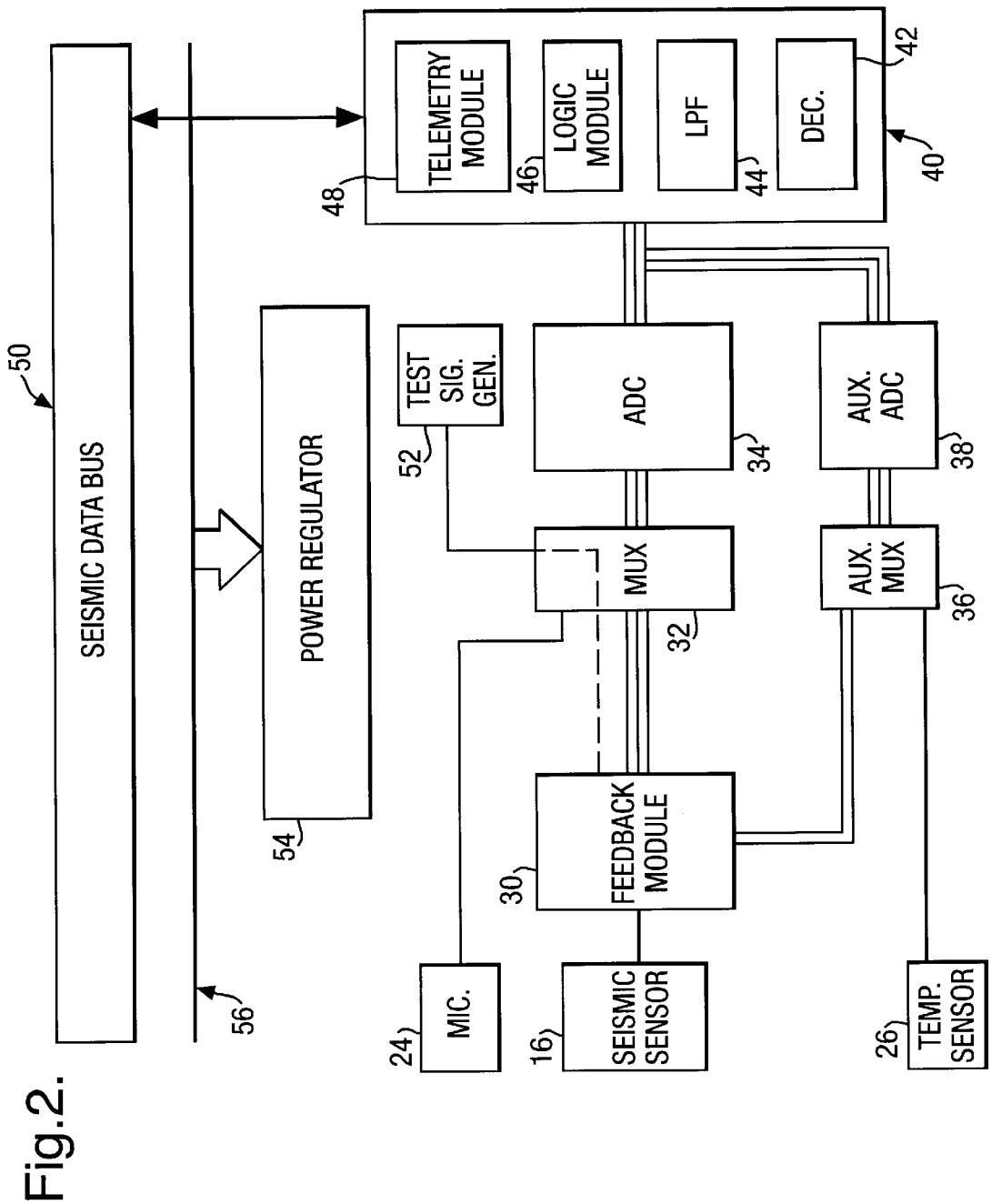
FIG. 2 is a schematic detailed block diagram of the sensor element and electronics of the seismic sensor unit according to FIG. 1.

FIG. 2 illustrates schematically details of the electronics inside the case 12 of the seismic sensor unit 10 of FIG. 1. The analog output signal of the 1-component feed-back controlled accelerometer 16 is passed through a feed-back control electronic module 30 that controls in particular the centring of the seismic mass of the accelerometer 16 during vibrations, ensures linearity of the accelerometer, and separates seismic (acoustic) signals from DC signals with a frequency below 3 Hz. After having passed through an analog low pass filter (not shown), the seismic signals are fed into a multiplexer 32 and then passed to an analog/digital converter (ADC) referred to by 34. Preferably, this ADC 34 is a sigma-delta converter that converts at very high sampling rates.

Output signals of the feed-back controlled accelerometer 16 with a frequency equal or less than about 3 Hz are treated as DC signals. Such DC signals allow a determination the local gravity effect at the planted seismic sensor unit 10. The measured gravity signal indicates whether the seismic sensor unit 10 is properly planted in the desired vertical position, or whether its inclination is still acceptable or not. As mentioned earlier, the feed-back control electronic module 30 separates the DC signals from the usual seismic signals from the seismic sensor 16 and passes them to an auxiliary multiplexer 36 from where the signals are applied to an auxiliary analog/digital converter (ADC) 38. The ADC 38 may also be a sigma-delta converter.

Output signals of both ADCs 34 and 38 are further processed in a block 40 of electronic modules that comprises at least a decimator 42, a low pass signal filter module 44, a logic module 46 with an attached data storage module, and a telemetry module 48. As is well known, the sigma-delta converter used as the ADC 34 has a high sampling rate at low accuracy. The decimator 42 is complementary to the sigma-delta converter that operates as a modulator at a high sampling rate, ie at 400 kHz, with typically one bit resolution. The decimator 42 processes digitally the oversampled bit stream to generate high accuracy samples of typically 24 bits at lower rate, ie 24 ms.

A digital low pass filter to attenuate noise is then applied by the low pass filter module 44 to the signals from the decimator 42. The signals then pass to the logic module 46, which applies calibration coefficients that are stored in its attached data storage means, preferably an EEPROM, and corrects the signals therewith. The telemetry module then conditions the signals and feeds them into the seismic data network system, which in FIG. 2 is symbolised by a seismic data bus 50. The seismic data bus 50 is connected to further seismic data recording and processing units that are not illustrated.

In FIG. 2, a test signal generator is shown at 52. This test signal generator 52 is capable of generating various test signals which serve to verify the functionality and performance of each module shown in FIG. 2. The test signals from the test signal generator 52 can therefore be fed either to the ADC 34 via the multiplexer 32 or via the multiplexer 32 back to the feed-back control module 30.

All above described electronic modules 30, 32, 34, 36, 38, 40, 52 are designed and manufactured using large scale integrated circuit technology, and more particularly as a minimum number of ASICS. This leads to a very small volume for the modules and allows them to be mounted on one single printed circuit board, as represented in FIG. 1 by the board 18.

A power regulator 54, preferably including a DC/DC converter or voltage regulator, serves to supply the electronics with power. Power provided by a power line 56, which together with the data bus line 50 - represents the seismic cable 22 (see FIG. 2), is stabilised by the power regulator 54 and distributed to the electronic modules inside the case 12. For simplicity, the wiring necessary for power distribution is not illustrated in FIG. 2, because this will be evident to a person skilled in the art and is not essential for an understanding of the present invention.

FIG. 2 shows the microphone 24 and temperature sensor 26, which have been already described above in relation to FIG. 1. FIG. 2 illustrates that the output signal of the microphone 24 is passed into the same multiplexer 32 as the seismic signal from the seismic sensor element 16. Each of the microphone 24, the seismic sensor element 16 and the test signal generator 52 is activated separately from the others. The output signal of the temperature sensor 26 is fed into the auxiliary multiplexer 36, as is the DC signal from the feed-back controlled accelerometer 16.

Figure 3:
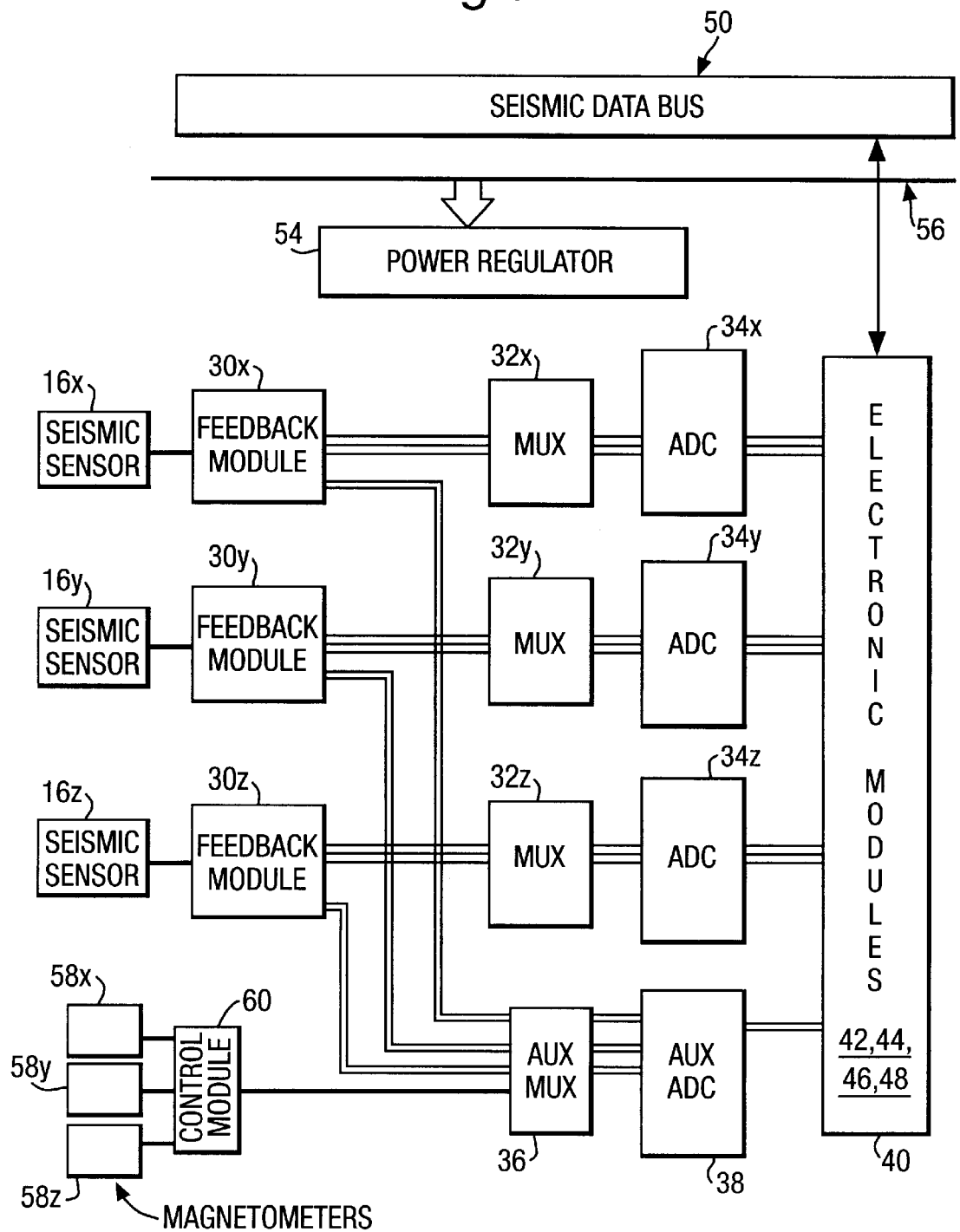
FIG. 3 is a detailed block diagram of the sensor elements and electronics of a second embodiment of a seismic sensor unit according to the invention.

In FIG. 3, a second embodiment of a seismic sensor unit according to the invention is illustrated, specifically an embodiment designed for a 3-component seismic element. Most of the electronic modules are the same or at least similar to those which have been already described in relation to FIGS. 1 and 2. The electronics of the embodiment schematically shown in FIG. 3 are such that they are suitable for a 3-component seismic sensor, which is preferably a temperature-compensated 3-component feed-back control accelerometer made as a silicon micro-machined device.

In the following description, the three components of the seismic sensor element 16 of FIGS. 1 and 2 are referred to as 16x, 16y and 16z. As described above in relation to FIG. 2, the output signals of the components 16x, 16y and 16z of the seismic sensor element 16 are fed into the related circuitry for each component's signal. Thus, the feedback control modules 30x, 30y, 30z control the performance of each seismic sensor component 16x, 16y, 16z. And as in the embodiment of FIG. 2, each component signal is then further processed in related multiplexers 32x, 32y, 32z and digitised in related analog/digital converters (ADCs) 34x, 34y, 34z. Preferably the ADCs are sigma-delta converters with the same features as already described in relation to FIG. 2.

As in the embodiment of FIG. 2, the auxiliary multiplexer and the auxiliary ADC are referred to as 36 and 38. Similarly, the DC signals of each seismic sensor element component 16x, 16y, 16z are passed to the auxiliary multiplexer 36 and then to the auxiliary ADC 38.

As a further modification to the embodiment shown in FIG. 2, a 3-component magnetometer 58x, 58y, 58z is included in the seismic sensor unit 10 of FIG. 3. The magnetometer is preferably a flux gate magnetometer with an associated electronic module that generates an AC flux across the magnetometer sensors and determines the DC offset of the hysteresis loop. This offset signal is proportional to the local earth magnetic vector. The performance of the magnetometer is controlled by a magnetometer electronic control module 60, from which the measurement signals of the magnetometer components are passed into the auxiliary multiplexer 36. The orientation of the axis of the magnetometer components 58x, 58y, 58z is the same as the orientation of the related components 16x, 16y, 16z of the feed-back controlled accelerometer, in other words, the axis of the accelerometer component 16x is parallel to the axis of magnetometer component 58x, and the same for the respective y and z axes. Together the magnetometer signals and the gravity related DC signals of the seismic sensor accelerometer are very useful to determine (and compensate for) the orientation of the seismic sensor unit 10 in view of inclination and azimuth.

The seismic signals from the ADCs 34x, 34y, 34z and the magnetometer signals and the DC gravity related accelerometer signals from the auxiliary ADC 39 are passed into the block of electronics 40 that has been already described in relation to FIG. 2. The various electronic modules 42, 44, 46, 48 (see FIG. 2) in the block 40 will then apply filtering and conditioning to the signals as also explained above. Preferably separate electronic modules x, y, z of the decimator 42 as well as of the digital low pass filter 44 perform the conditioning of the signal components x, y, z. Other modules similar to those illustrated in FIG. 2, eg a test signal generator, are not shown in FIG. 3 for simplicity, but it will be apparent to a person skilled in the art how such a test signal generator 52 can be connected to the seismic sensor element components 16x, 16y, 16z.

Again, the electronic modules 32x, 32y, 32z. 34x, 34y, 34z, 36, 38, 40, 60 are designed and manufactured using large scale integrated circuit technology, and more particularly as ASICS.

Figure 4:
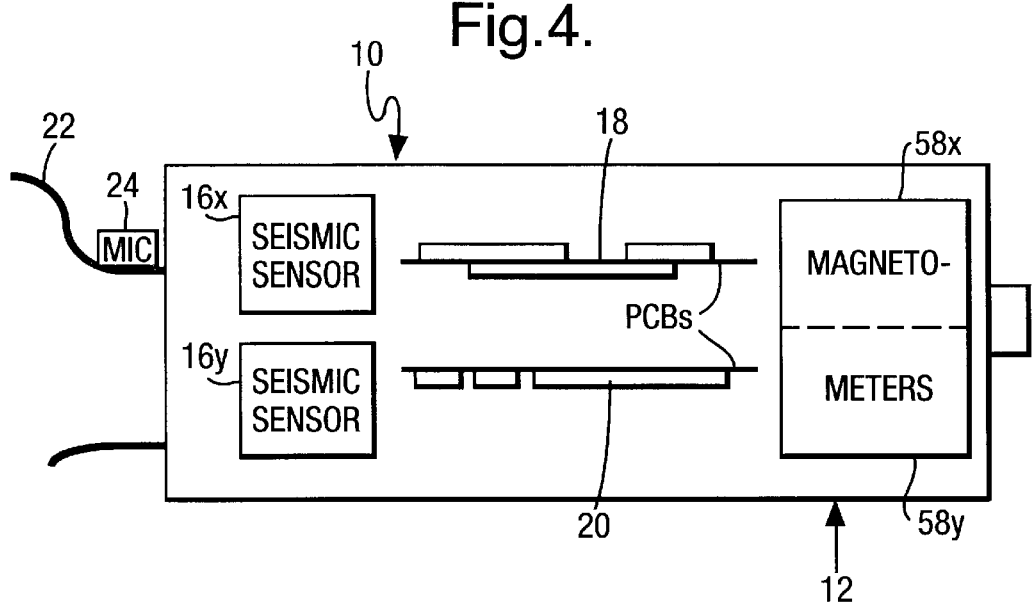
FIG. 4 is a schematic drawing that illustrates a first implementation of the seismic sensor unit according to FIG. 3.
Figure 5:
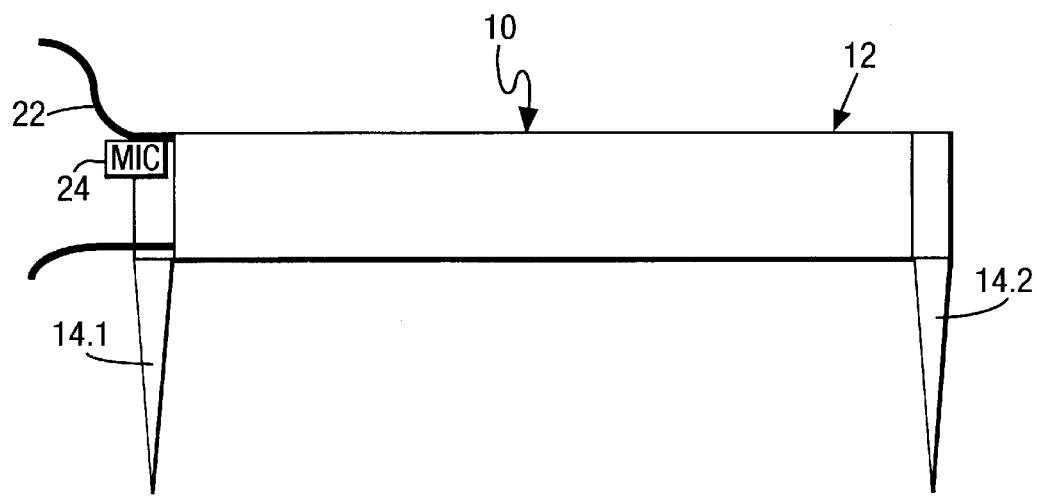
FIG. 5 is a detailed schematic side view of the sensor unit of FIG. 4.

FIGS. 4 and 5 show how a seismic sensor unit 10 with a 3-component seismic sensor element 16x, 16y (not shown) is mechanically constructed. Inside the case 12 of the seismic sensor 10, electronic boards 18, 20 are arranged between the seismic sensor element components 16x, 16y, 16z and the magnetometer components 58x, 58y and 58z (not shown). If the seismic cable 22 is fixed to the case 12 as shown in FIG. 4, the magnetometer components 58x, 58y and 58z should be mounted at the opposite end of the case to the cable 22. Two spike 14.1, 14.2 are fixed to the case 12 as shown in FIG. 5. The advantage of this two spikes embodiment is that it ensures a mechanically stable planting in the ground.

Figure 6:
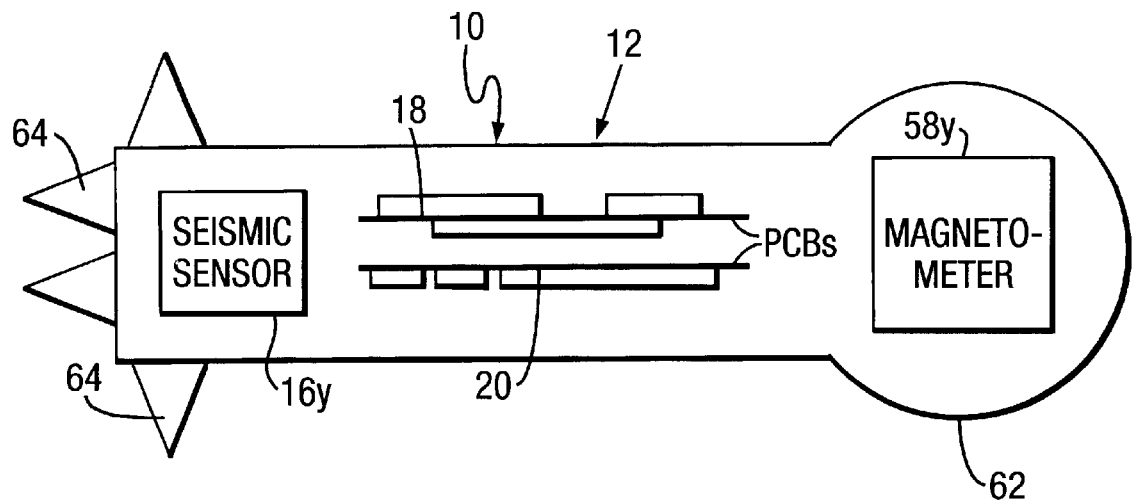
FIG. 6 is a schematic drawing that illustrates a second implementation of the seismic sensor unit according to FIG. 3.
Figure 7:
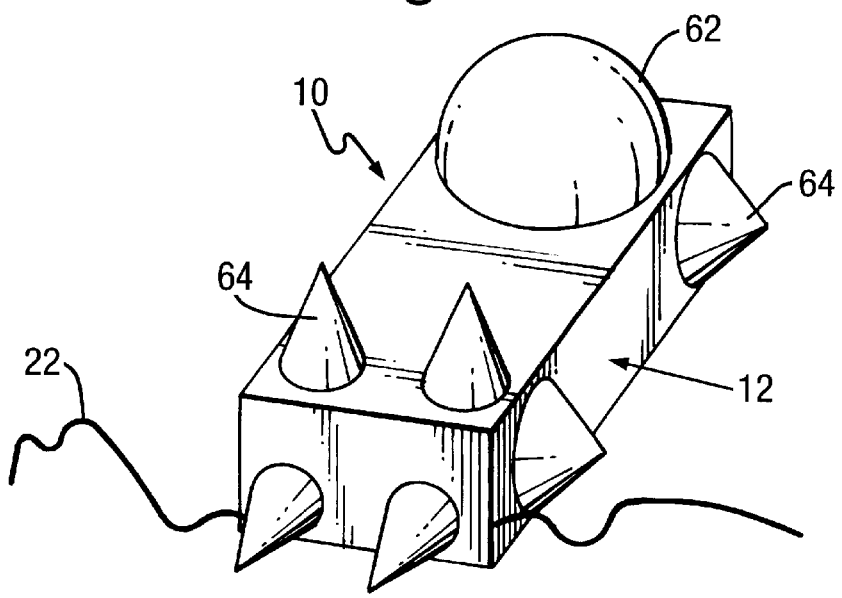
FIG. 7 is a perspective side view of the sensor unit of FIG. 6.

In FIGS. 6 and 7, another embodiment of a seismic sensor unit 10 according to the invention is shown, which embodiment comprises a 3-component seismic sensor element 16 (of which only component 16y is shown) and a 3-component magnetometer 58 (of which only component 58y is shown). The case 12 of this sensor unit has a spherical part 62 that houses the magnetometer 58, which again is mounted at the opposite end of the case to the seismic cable 22 because of the current in the cable. Furthermore, the magnetometer 58 is mounted opposite to the seismic sensor element 16 in order to limit potential magnetic perturbations that may be caused by magnetic or metal parts inside the accelerometer 16. The case 12 is equipped with several small spikes 64, as shown, to ensure sufficient acoustical coupling to the ground without a conventional (and rigid) planting action. This type of case 12 also supports simplified or automatic deployment of the sensor units 10, because the case 12 always tends to turn itself into the best position on the ground.

What is claimed is:

1. A seismic sensor unit, particularly but not exclusively adapted for land applications, comprising:

a case that houses, at least one electric seismic sensor element adapted for generating a sensor unit output signal, said seismic sensor element being a feedback controlled accelerometer adapted for generating a gravity related sensor unit output signal, said accelerometer having a component with an associated axis, and at least one magnetometer, the magnetometer being a flux gate magnetometer including an associated electronic module adapted for generating one or more magnetometer output signals in the form of an AC flux across the magnetometer sensors, said magnetometer having a component with an associated axis, the axis of the accelerometer component being approximately parallel to the axis of the magnetometer component, said magnetometer output signals generated from said magnetometer and said gravity related sensor unit output signal generated from said feedback controlled accelerometer together in combination determining and compensating for an orientation of the seismic sensor unit in view of inclination and azimuth, a first electronic circuit being responsive to the gravity related sensor unit output signals and the magnetometer output signals adapted for digitizing said sensor unit output signals that are generated from said seismic sensor element and the magnetometer output signals that are generated from the magnetometer, and a second electronic circuit, said second electronic circuit including a telemetry interface module adapted for exchanging signals and data with a seismic data acquisition network, a signal filter module, and a logic and signal conditioning module; and a cable, fixed to the case, for allowing a supply of power to the sensor unit and for transmitting the sensor unit output signal to other seismic sensor units or to a signal processing unit.

2. The seismic sensor unit of claim 1, wherein said case also houses a third electronic circuit that comprises input and conditioning elements for supplemental measured signals.

3. The seismic sensor unit of claim 2, wherein the case also houses a voltage regulator.

4. The seismic sensor unit of claim 2, wherein the case also houses a voltage regulator including a DC/DC converter.

5. The seismic sensor unit of claim 1, further comprises three of said sensor elements in the case arranged to form a 3-component seismic sensor element.

6. The seismic sensor unit of claim 5, wherein each of the three sensor elements comprise said feedback controlled accelerometer.

7. The seismic sensor unit of claim 6, wherein each feedback controlled accelerometer of the three sensor elements is arranged to produce a gravity measurement in the form of a DC sensor output signal.

8. The seismic sensor unit of claim 7, further comprising a microphone.

9. The seismic sensor unit of claim 8, further comprising at least one temperature sensor.

10. The seismic sensor unit of claim 9, wherein each seismic sensor element is temperature compensated.

11. A seismic sensor unit, comprising:

a case;

a seismic sensor element disposed within said case, said seismic sensor element being placed on and acoustically coupled through said case to a ground, said seismic sensor element being a feedback controlled accelerometer adapted for measuring seismic signals having low frequencies and generating a gravity related output signal, said accelerometer having a component with an associated axis;

a magnetometer having sensors disposed within said case, said magnetometer being a flux gate magnetometer adapted for generating a magnetometer output signal in the form of an AC flux disposed across the sensors of said magnetometer, said magnetometer having a component with an associated axis, the axis of the accelerometer component being approximately parallel to the axis of the magnetometer component, the magnetometer output signal from the magnetometer and the gravity related output signal from the feedback controlled accelerometer seismic sensor element together, in combination, being used to determine and compensate for an orientation of the seismic sensor unit in view of inclination and azimuth;

an analog to digital converter apparatus disposed within said case, connected to an output of the seismic sensor element and the magnetometer, and responsive to the gravity related output signal from the seismic sensor element and to the magnetometer output signal from the magnetometer adapted for digitizing the gravity related output signal from the feedback controlled accelerometer and digitizing the magnetometer output signal from the magnetometer; and an electronic circuit disposed within said case and connected to an output of the analog to digital converter apparatus, said electronic circuit including a telemetry interface module adapted for exchanging information with a seismic data acquisition network, and a signal filter module adapted for filtering the digitized gravity related output signals from the feedback controlled accelerometer before transmission of said signals to said seismic data acquisition network.

12. The seismic sensor unit of claim 11, further comprising a microphone.

13. The seismic sensor unit of claim 12, further comprising at least one temperature sensor.

14. A seismic sensor unit, comprising:

a case;

a plurality of seismic sensor elements disposed within said case, said plurality of seismic sensor elements being placed on and acoustically coupled through said case to a ground, each of said seismic sensor elements being a feedback controlled accelerometer adapted for measuring seismic signals having low frequencies and generating a corresponding plurality of gravity related output signals, the gravity related output signals indicating whether the seismic sensor unit is properly planted in a desired vertical position in said ground and whether its inclination is acceptable, each of the accelerometers including a component with an associated axis;

a plurality of magnetometers each having sensors disposed within said case, said plurality of magnetometers each being a flux gate magnetometer adapted for generating a magnetometer output signal in the form of an AC flux disposed across the sensors of said magnetometers, each of the magnetometers including a component with an associated axis;

the axes of the accelerometer components being approximately parallel to the axes of the magnetometer components, the magnetometer output signals from the magnetometers and the gravity related output signals from the feedback controlled accelerometer seismic sensor elements together, in combination, being used to determine and compensate for an orientation of the seismic sensor unit in view of inclination and azimuth;

a feedback control apparatus connected to an outputs of the feedback controlled accelerometers of the plurality of seismic sensor elements adapted for controlling a centering of a seismic mass of said accelerometers during vibrations, ensuring linearity of the accelerometers, and separating seismic signals from some DC signals;

an analog to digital converter apparatus disposed within said case, connected to an output of the feedback control apparatus, and responsive to the gravity related output signals from the accelerometers and the magnetometer output signals from the magnetometers adapted for digitizing the gravity related output signal from the feedback controlled accelerometer and digitizing the magnetometer output signal from the magnetometer which emerge from an output of the feedback control apparatus; and an electronic circuit disposed within said case and connected to an output of the analog to digital converter apparatus, said electronic circuit including a telemetry interface module adapted for exchanging information with a seismic data acquisition network, and a signal filter module adapted for filtering the digitized gravity related output signals from the feedback controlled accelerometer before transmission of said signals to said seismic data acquisition network.

* * * * *